Jan. 15, 1924.                     L. JOHNSON                     1,481,208
HEAT PRODUCING COMPOSITION
Filed May 1, 1923
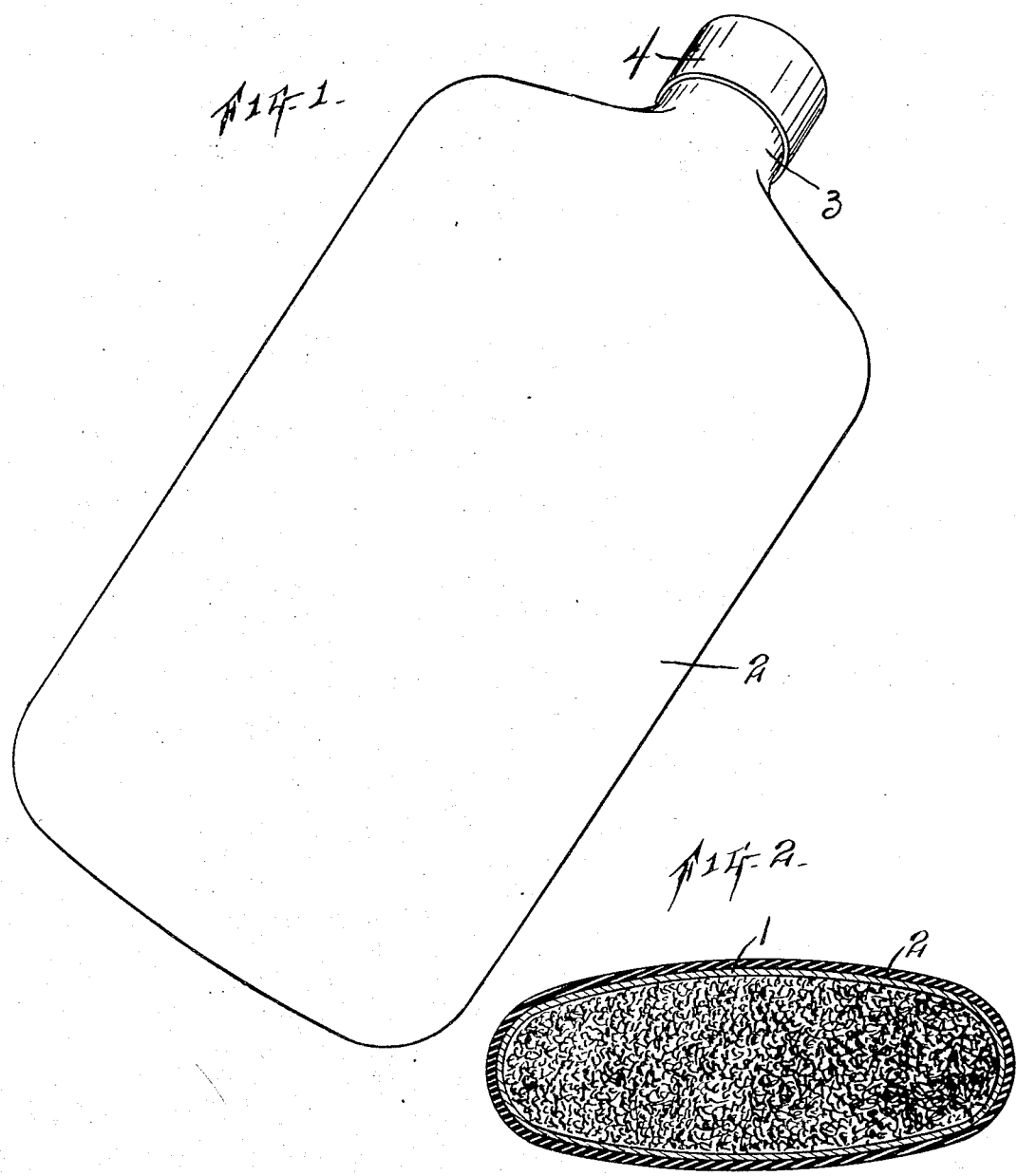
Inventor
LUKE JOHNSON
By A. L. Jackson
Attorney Patented Jan. 15, 1924.

1,481,208

UNITED STATES PATENT OFFICE.

LUKE JOHNSON, OF DALLAS, TEXAS.

HEAT-PRODUCING COMPOSITION.

Application filed May 1, 1923. Serial No. 636,026.

*To all whom it may concern:*

Be it known that I, LUKE JOHNSON, a citizen of the United States, residing at Dallas, in the county of Dallas and State of Texas, have invented a certain new and useful Improvement in Heat-Producing Composition, of which the following is a specification.

My invention relates to heat applying devices and more particularly to flexible heat bags which are provided with heat generating compositions; and the object is to provide a simple device for relieving pain from the body and for keeping parts of the body warm and treating parts of the body by providing elements which will develop heat for long periods of time and which will maintain a constant heat for long periods of time, and to provide a device which can be furnished at small cost and which can be charged at small cost. Other objects and advantages will be fully explained in the following description and the invention will be more particularly pointed out in the claims.

Reference is had to the accompanying drawings which form a part of this application.

Fig. 1 is a perspective view of a flexible bag used for carrying out the objects of this invention. Fig. 2 is a transverse section of the same.

Similar characters of reference are used to indicate the same parts throughout the several views.

The heat generating means consists of certain chemicals which must be properly mixed and compounded. The composition used includes oxide of iron, sodium acetate, calcium chloride (preferably 98% pure), muriate of ammonia, powered cloves, and amounts of each element may be varied for different purposes as may be required. I preferably use the ingredients in the proportion of five pounds of iron oxide, one-fourth ounce of calcium chloride, one fourth ounce of sodium acetate, and one and one-half ounces of muriate of ammonia, and one teaspoonful of cloves. Cast iron or cast iron filings are pulverized to a powder and spread and enough water poured on the powdered material to make it thoroughly wet. This may be kept up as long as may be necessary. This produces rust, technically or commercially known as iron oxide or oxide of iron. The cloves are in powdered form and will prevent disagreeable odors caused by the chemicals. The ingredients are properly mixed and the heat development is started by application of moisture. The sodium acetate will tend to keep the composition damp and the calcium chloride will tend to prolong the moisture in the composition. When the ingredients have been properly mixed, they are placed in a housing or bag 1 which should be made of liquid or moisture absorbent material. This housing 1 is inclosed in another housing 2 of rubber. The rubber housing 2 is provided with a mouth or receiving nozzle 3 which may be closed liquid tight by a screw cap 4.

The ingredients are thus surrounded by a water absorbent material and inclosed in a housing of rubber which prevents the loss of moisture and prevents deterioration of the chemicals. It is apparent that the device may be used without making the cap 4 watertight. The generation of heat is started by the application of water or suitable moisture.

What I claim, is,—

1. A heating composition comprising heat producing materials consisting of oxide of iron, sodium acetate, calcium chloride, muriate of ammonia, and odor preventing material, and a flexible water absorbent housing inclosing said ingredients.

2. A heating composition comprising heat producing materials consisting of approximately five pounds of oxide of iron, one-fourth ounce of sodium acetate, one-fourth ounce of calcium chloride, one and one-half ounce of muriate of ammonia, and one teaspoonful of powered cloves, and a flexible water absorbent housing inclosing said ingredients.

3. A heat producing composition comprising a container of flexible water carrying housing, a composition of five pounds of oxide of iron, one-fourth ounce of sodium acetate, one-fourth ounce of calcium chloride, one and one-half ounce of muriate of ammonia, and a teaspoonful of powdered cloves.

In testimony whereof, I set my hand, this 25 day of April, 1923.

LUKE JOHNSON.